Oct. 7, 1969  M. CRADDOCK  3,470,742
PROBE ELECTRODE
Filed Jan. 25, 1968
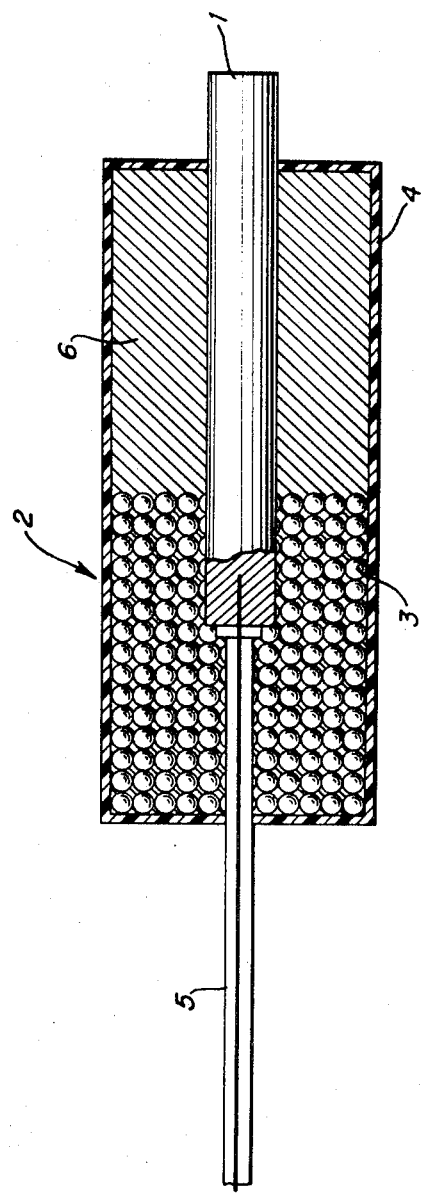
INVENTOR.
MIKE CRADDOCK

United States Patent Office 3,470,742
Patented Oct. 7, 1969

3,470,742
PROBE ELECTRODE
Mike Craddock, P.O. Box 1068,
Big Spring, Tex. 79720
Filed Jan. 25, 1968, Ser. No. 700,391
Int. Cl. G01f 23/00
U.S. Cl. 73—304            1 Claim

ABSTRACT OF THE DISCLOSURE

An electrode used to detect the liquid level in tanks containing corrosive liquids. The junction between the electrode, which is of carbon, and its supporting electrical conductor is covered by a potting material containing lead pellets, and this potting material is enclosed within a protective plastic housing.

---

This invention is a new design for a probe, or electrode, especially designed for placement in corrosive liquids such as are found in water tanks in the oil field.

The probe is used in conjunction with a latching relay circuit to form a liquid level control system.

There are two basic problems involved in a "probe" type level control:

(1) Corrosive action of the fluid tends to corrode the electrode itself, and the wire connected to it.

(2) Electrolysis caused by the relay current causes corrosion of the electrode and the wire connected to it.

In the past, the best probes commercially available were constructed of a stainless steel rod connected to a separate stainless steel conductor. Although, the stainless steel is highly resistive to chemical corrosion, it has no defense against electrolysis, and therefore often fails. The rod becomes covered with a high electrically resistive deposit, and the conductor will part—dropping the probe into the tank.

My probe overcomes both problems by using first, a carbon electrode. Carbon is highly immune to the action of both chemical corrosion and electrolysis. Second, the conductor is mechanically connected to the carbon electrode, then the connection is potted in a plastic casing to prevent the tank fluid from coming in contact with the metallic connection. The plastic casing is extended downward to form a protective skirt around the electrode to prevent accidental contact to the side of the tank and to protect the carbon rod from breakage due to mechanical contact. Further, the potting around the carbon-metal connection is filled with lead pellets to help the probe sink into liquids of high salt concentration.

The single figure of the drawing is a cross-sectional view of the electrode of the invention.

In the drawing the potted electrode connection is designated generally by the reference numeral 2. The carbon electrode 1 is mechanically connected to and suspended from an electrical conductor 5. The connection is protected by a plastic housing or skirt 4 positioned therearound. The upper part of the skirt contains metal pellets 3 which are secured in place by potting material 6. Thus the connection between the electrode and conductor is protected from corrosive action of surrounding fluids and the carbon electrode insulated from mechanical shock by the potting material. The metal pellets insure that the electrode will sink even in the heaviest of liquids.

What is claimed is:

1. In a system for detecting the level of a water level in a tank or other container, the combination of:
    an insulated stranded conductor mechanically fastened to a carbon rod;
    a group of metal weight pellets surrounding the conductor to carbon connection;
    a potting of insulating corrosion resistant material around the carbon rod, and its connection to the wire and around and within the metal weight pellets;
    a housing around the wire to carbon connection, surrounding said weight pellets, and insulating compound, to form a case and a protective skirt.

References Cited

UNITED STATES PATENTS

| 2,593,252 | 4/1952 | Booth | 33—126.5 |
| 3,038,849 | 6/1962 | Preiser | 204—196 |
| 2,776,940 | 1/1957 | Oliver | 204—294 |

FOREIGN PATENTS

| 888,909 | 2/1962 | Great Britain. |

S. CLEMENT SWISHER, Primary Examiner